United States Patent
Preijert

(10) Patent No.: US 9,555,824 B2
(45) Date of Patent: Jan. 31, 2017

(54) METHOD AND ARRANGEMENT FOR AN ELECTRICAL STEERING SYSTEM

(71) Applicant: VOLVO TRUCK CORPORATION, Göteborg (SE)

(72) Inventor: Stefan Preijert, Göteborg (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 14/654,038

(22) PCT Filed: Dec. 20, 2012

(86) PCT No.: PCT/SE2012/000214
§ 371 (c)(1),
(2) Date: Jun. 19, 2015

(87) PCT Pub. No.: WO2014/098655
PCT Pub. Date: Jun. 26, 2014

(65) Prior Publication Data
US 2015/0329141 A1    Nov. 19, 2015

(51) Int. Cl.
*B62D 6/00* (2006.01)
*B62D 6/04* (2006.01)
(Continued)

(52) U.S. Cl.
CPC .............. *B62D 1/16* (2013.01); *B62D 5/0463* (2013.01); *B62D 6/008* (2013.01); *B62D 6/04* (2013.01)

(58) Field of Classification Search
CPC .......... B62D 1/16; B62D 5/0463; B62D 6/04; B62D 6/008
(Continued)

(56) References Cited

U.S. PATENT DOCUMENTS 6,219,604 B1  4/2001  Dilger et al.
6,250,419 B1  6/2001  Chabaan et al.
(Continued)

FOREIGN PATENT DOCUMENTS

EP    1081018 A2    3/2001
JP    S59096062     6/1984
(Continued)

OTHER PUBLICATIONS

International Search Report (Sep. 9, 2013) for corresponding International application No. PCT/SE2012/000214.
(Continued)

*Primary Examiner* — Brian P Sweeney
(74) *Attorney, Agent, or Firm* — WRB-IP LLP

(57) ABSTRACT

A method for assisting a driver of a vehicle during operation by providing the driver with a desired steering feel, involves detecting a first steering angle for an output shaft, which first steering angle indicates the position of ground engaging members; detecting a second steering angle for an input shaft, which second steering angle indicates the position of a steering device; comparing the first and second steering angles and determining a current state of a steering arrangement; and controlling a first actuator connected to the output shaft and a second actuator connected to the input shaft in response to the detected first and second steering angles, in order to achieve a desired state of the steering arrangement; and applying a torque to the steering device proportional to the angular difference between the output shaft and the input shaft using a resilient portion in an interconnection. An arrangement is also disclosed.

21 Claims, 7 Drawing Sheets

(51) Int. Cl.
*B62D 5/04* (2006.01)
*B62D 1/16* (2006.01)

(58) Field of Classification Search
USPC .......................................................... 701/41
See application file for complete search history.

(56) References Cited

U.S. PATENT DOCUMENTS

| | | | |
|---|---|---|---|
| 9,102,355 B2 * | 8/2015 | Svensson | B62D 5/0472 |
| 2007/0192005 A1 | 8/2007 | Ishikawa et al. | |
| 2007/0256885 A1 | 11/2007 | Ammon et al. | |
| 2012/0101687 A1 | 4/2012 | Svensson et al. | |

FOREIGN PATENT DOCUMENTS

| | | |
|---|---|---|
| JP | H06206553 | 7/1994 |
| JP | H11078945 | 3/1999 |
| JP | 2006111065 | 4/2006 |
| JP | 2007210374 | 8/2007 |

OTHER PUBLICATIONS

Japanese Official Action (Oct. 27, 2016) for corresponding Japanese Application 2015-549304.

* cited by examiner

METHOD AND ARRANGEMENT FOR AN ELECTRICAL STEERING SYSTEM

BACKGROUND AND SUMMARY

The invention relates to a method and an arrangement for assisting a driver of a vehicle during operation by providing the driver with a desired steering feel.

Different steering equipment for assisting a driver to steer a vehicle are well known in the art. Traditionally the driver controls the direction of the vehicle with the aid of a steering wheel mechanically connected to the road wheels through a steering assembly. However, to assist the driver it is common to use an auxiliary system to generate an additional force, which is applied to the steering assembly of the vehicle. The additional force reduces the effort required by the driver in changing the direction of the road wheels. Said additional force can be generated by different techniques, e.g. by a hydraulic drive or an electric motor.

Traditionally, various hydraulic power assisted steering (HPAS) systems have been used to add a certain amount of assist torque or assist force to the steering assembly of the vehicle. Such hydraulic systems are typically based on an assist characteristic, often called boost-curve. The shape of a boost-curve is generally determined by the design of the valve and the pump in the hydraulic system. It follows that the assist characteristic in a traditional HPAS-system is static, i.e. the relation between the steering effort required from the driver and the assist torque supplied by the HPAS-system is dependent on a predetermined and static boost-curve. The operation of a boost-curve based HPAS-system is generally such that a certain torque applied by the driver to the steering wheel results in a certain assist torque applied by the HPAS-system to the steering assembly of the vehicle, where the assist torque increases as the driver needs to apply more torque to the steering wheel and decreases as the driver needs to apply less torque to the steering wheel. The amount of torque, which the driver needs to apply to the steering wheel, is in turn dependent upon the specific driving scenario, e.g. dependent upon the vehicle speed, the vehicle turning angle etc.

The static or nearly static assist characteristic of an HPAS-system makes it difficult or impossible to find an appropriate balance between the transmission of road disturbances to the driver and the delivery of suitable steering feel to the driver.

If an HPAS-system uses high static assist torque, less steering effort is needed from the driver, which can be advantageous e.g. to reduce the steering effort needed for parking manoeuvres. A high assist torque will also reduce the transmission of road disturbances to the steering wheel when the vehicle moves, which is another advantage. However, while a high assist torque reduces the influence from road disturbances, a high assist torque will also make the vehicle sensitive for steering wheel inputs, especially at highway speed, which is a disadvantage since it reduces the steering feel.

If an HPAS-system uses a low static assist torque, more steering effort is needed from the driver. However, this stabilises vehicle response to manoeuvres at highway speed and consequently increases the steering feel which is an advantage. On the other hand, low assist torque will also increase the transmission of road disturbances to the driver, which is an unwanted effect in the steering wheel and consequently a disadvantage.

In recent years the older HPAS-systems has been replaced by various electric power assisted steering (EPAS) systems to be used in connection with vehicle steering.

For instance, U.S. Pat. No. 6,250,419 shows a steering system of a vehicle, wherein a controller is used to control an electric motor in an EPAS-system. The electric motor is controlled depending on estimated pinion torque, steering column angle, electric motor velocity, desired assist torque, estimated driver torque, and a measure of the steering wheel torque applied by the driver. The final control signal, which is received by the electric motor, is then calculated by adding a contribution from a non-linear boost-curve to the result from the controller. The boost-curve maps the amount of input command to the electric motor versus the estimated driver torque. Depending on the estimated driver torque the boost-curve points out an amount of input command to be supplied to the electric motor. The system does not explicitly decouple the control of the steering wheel torque from attenuation of road disturbances, since the output from the boost-curve is influenced by road disturbances inherent in the estimated driver torque.

U.S. Pat. No. 6,219,604 shows a steering system of an automobile, wherein a controller structure for an entire steering system is described. The controller structure uses a steer-by-wire concept, which means that there is no mechanical connection between the steering wheel and the steering gear assembly. If such a mechanical connection were present in the steering gear assembly it would be responsible for transmission of road disturbances to the driver. When this connection is substituted or simulated by e.g. electrical means, road disturbances can be eliminated. To convey a steering feel to the driver a first electric motor, controlled by an electronic steering device, imposes a controllable resistance torque to the steering wheel. The steering wheel resistance torque can be determined and processed by measuring the current applied to a second electric motor that imposes a steering torque to the steering gear assembly, or by directly measuring the torque that is imposed by said second electrical motor to the steering gear assembly. The steering wheel resistance torque may alternatively be calculated by creating a model, using various vehicle data (e.g. vehicle speed, friction between road surface and tires, steering wheel angle, etc).

The prior art references cited above do not specifically address the problem of controlling the steering characteristics experienced by the driver and at the same time controlling the amount of road disturbances transmitted to the driver. Especially, the references do not address the problem of accomplishing a control of the steering characteristics independent from the control of said transmission of road disturbances. In particular they do not address said problems in connection with a vehicle steering assembly comprising a steering shaft arrangement, which mechanically connects the steering wheel to the road wheels.

It is desirable to provide an improved method and arrangement for solving the above problems.

According to a preferred embodiment, the invention relates, according to an aspect thereof, to a method for assisting a driver of a vehicle during operation by providing the driver with a desired steering feel, wherein the vehicle comprises a steering arrangement comprising an input shaft, such as a steering column, connected to a manually operated steering device, an output shaft connected to at least one pair of ground engaging members, or wheels, and a mechanical interconnection connecting the output shaft and the input shaft. The mechanical interconnection is a force transmitting element for transmitting a torque between the manually operated steering device and the ground engaging members.

The ground engaging members, or wheels, can be controlled by a servo or power steering arrangement located between the output shaft and the at least one pair of ground engaging members. The power steering arrangement is used to assist the driver when turning the engaging members. Power steering arrangements are usually electrically or hydraulically operated and are well known in the art.

The method according to an aspect of the invention involves the steps of
- detecting a first steering angle for the output shaft, which first steering angle indicates the position of the ground engaging members;
- detecting a second steering angle for the input shaft, which second steering angle indicates the position of the steering device;
- comparing the first and second steering angles and determining a current state of the steering arrangement; and
- controlling a first actuator connected to the output shaft and a second actuator connected to the input shaft in response to the detected first and second steering angles, in order to achieve a desired state of the steering arrangement;
- applying a torque to the steering device proportional to the angular difference between the output shaft and the input shaft using a resilient portion in the mechanical interconnection, in order to provide the driver with a desired steering feel.

The resilient portion is a part of the mechanical interconnection connecting the output shaft and the input shaft. This connecting portion can be made from a suitable resilient material, such as natural or synthetic rubber. Depending on the application the connecting portion can have a maximum angle of twist in the range 5-20°. The maximum angle of twist is the angle above which the angular difference will no longer increase, even if the torque applied over the resilient portion is increased. The first actuator connected to the output shaft and a second actuator connected to the input shaft can be controlled independently, in the same or in opposite directions. When the input and output shafts are rotated at different rates in the same direction, or in opposite directions by the actuators then an angular displacement between the ends of the shafts connected to the mechanical interconnection will be taken up by the resilient portion.

The subsequent text comprises a number of examples where a current state of the steering arrangement requires rotation of the input shaft and/or the output shaft in opposite directions. According to these examples, the method involves the step of controlling the first and the second actuators by applying torque to the input shaft and the output shaft in opposite directions in response to the determined current state of the steering arrangement.

In a first example the method involves the steps of:
- detecting a changing first steering angle indicating a deflection of the ground engaging members;
- detecting a constant second steering angle indicating a fixed position of the steering device;
- controlling the first and the second actuators in response to the detected first steering angle;
- counteracting the torque transmitted from the ground engaging members by applying an equal and opposite torque to the output shaft; and
- counteracting the torque transmitted from the output shaft by applying an equal and opposite torque to the input shaft to maintain a constant second steering angle for the steering device.

By controlling the first and the second actuators to apply a fluctuating torque in equal and opposite directions, it is possible to counteract a fluctuating torque transmitted from the ground engaging members during a "bump steer" or "roll steer" condition.

A bump steer condition is a transient state which occurs when at least one steerable wheel encounters an obstacle causing both wheels rise together. A roll steer condition is a transient state which occurs when at least one steerable wheel rises, or when one rises as the other falls. The effect of bump-steer is for the wheel to cause the suspension to move up or down, which in turn can induce movement of the steering linkage connecting the pitman arm of the steering gear to the steered wheel. Bump steer is undesirable because the suspension is steering the vehicle instead of the driver.

By controlling the first and the second actuators to apply a continuous torque in equal and opposite directions to counteract a static suspension induced torque from a steering linkage connecting the ground engaging members and the output shaft. By applying said continuous torque it is possible to maintain the steering device in a predetermined position, in order to provide steering error compensation. Steering error compensation can be used for eliminating a static steering error, causing the steering wheel to be angled off centre. This condition can occur when, for instance, the vehicle is loaded so that the front of the chassis is elevated above a predetermined level. The relative position of the wheel and the steering gear will generate a steering error that cannot be corrected by the steering geometry of the steering linkage. Even if the static steering error is relatively small, such as a few degrees, it is noticeable to the driver when the vehicle is travelling straight ahead.

In a second example the method involves the steps of:
- detecting a current first steering angle indicating a deflection of the ground engaging members;
- detecting a current second steering angle indicating a steering input from the steering device;
- controlling the first and the second actuators in response to the detected first steering angle;
- applying a first torque to the output shaft to transmit a steering torque to the ground engaging members in response to the steering input; and
- applying a second torque to the input shaft in the opposite direction providing a resistance to the steering input.

By applying a first torque that is greater than the second torque it is possible to provide a steering feel indicating understeer. In this case the first torque to the output shaft for turning the ground engaging elements is greater than the second torque to the input shaft, wherein the elastic steering force transmitting element provides a resistance to the driver input. This function is desirable when a vehicle with a heavy load is negotiating a bend in the road, wherein the transverse acceleration is above a predetermined value. In order to achieve the required wheel angle to follow the bend, the driver has to turn the steering wheel further than under normal conditions. This will give the driver the impression that the vehicle is understeered, which encourages the driver to reduce speed through bends.

By applying a first torque that is less than the second torque it is possible to provide a steering feel indicating oversteer. In this case the first torque to the output shaft for turning the ground engaging elements is less than the second torque to the input shaft, wherein the elastic steering force transmitting element provides assistance to the driver input. This function is desirable when a vehicle is being manoeuvred at relatively low speed, wherein the transverse acceleration is below a predetermined value. When negotiating tight corners during manoeuvring the vehicle at low speed the driver needs to turn the steering wheel less than under normal conditions to achieve a desired wheel angle. This provides an oversteered response, giving the driver the impression that the vehicle is easily manoeuvred.

The decision to apply the method according to the second example is dependent on the current state of the steering arrangement. The current state of the steering arrangement is in turn dependent on the current loading on said arrangement, which is proportional to the lateral acceleration of the vehicle. The lateral acceleration is determined by conventional means, for instance, by available sensors on the vehicle, such as an acceleration sensor or a vehicle speed sensor in combination with vehicle chassis data (vehicle wheel base, etc.). Means for the determination of the transverse acceleration is commonly available on vehicles and is not part of the invention per se.

The invention further relates, according to an aspect thereof, to a steering arrangement in a vehicle. The steering arrangement comprises an input shaft, or steering column, connected to a manually operated steering device, such as a steering wheel, an output shaft connected to at least one pair of ground engaging members such as wheels, via a steering linkage. The steering arrangement as a mechanical interconnection between the input shaft and the output shaft, and angular sensors arranged to detect the angular positions of the steering device and the ground engaging members. An electronic control unit is arranged to determine a current state of the steering arrangement The steering arrangement further comprises a first actuator connected to the output shaft, and a second actuator connected to the input shaft. The first and second actuators can be electric or hydraulic motors. An elastic steering force transmitting element connects the input shaft and the output shaft. This connecting portion between the input shaft and the output shaft can be made from a suitable resilient material, such as natural or synthetic rubber.

The first and the second actuators are individually controllable and are arranged to rotate the output shaft and the input shaft, respectively, either in the same or in opposite directions in response to the detected angular positions of the steering device and the ground engaging members, and the current state of the steering arrangement. The steering force transmitting element is arranged to apply a torque to the steering device proportional to the angular difference between the output shaft and the input shaft.

In general, the first and the second actuators can be controlled to act in the same direction in order to provide servo assistance for turning the ground engaging members, either instead of or in conjunction with an existing servo mechanism or steering gear. Alternatively, the first and the second actuators can be controlled to act in opposite directions in order to provide an enhanced steering feel and to assist the driver under predetermined conditions, for instance when unexpected or undesirable feedback is transmitted towards the steering wheel from the ground engaging members or from the suspension via the steering linkage.

According to one example the first and the second actuators are arranged to apply torque to the output shaft and the input shaft in opposite directions in response to the determined current state of the steering arrangement.

In this first example, the first and the second actuators can be arranged to apply a fluctuating torque in equal and opposite directions to counteract a fluctuating torque from the ground engaging members during a bump steer condition.

Alternatively, the first and the second actuators are arranged to apply a continuous torque in equal and opposite directions to counteract a suspension induced torque from a steering linkage connecting the ground engaging members and the output shaft, in order to maintain the steering device in a predetermined position.

According to a second example the first actuator is arranged to apply a first torque to the output shaft to transmit a steering torque to the ground engaging members in response to the steering input; and that the second actuator is arranged to apply a second torque to the input shaft in the opposite direction providing a resistance to the steering input.

In this second example, the first torque is less than the second torque to provide a steering feel indicating understeer. This function is desirable when a vehicle with a heavy load is negotiating a bend in the road, wherein the transverse acceleration is above a predetermined value. In order to achieve the required wheel angle to follow the bend, the driver has to turn the steering wheel further and/or with more effort than under normal conditions. This will give the driver the impression that the vehicle is understeered, which encourages the driver to reduce speed through bends.

Alternatively, the first torque is greater than the second torque to provide a steering feel indicating oversteer. This function is desirable when a vehicle is being manoeuvred at relatively low speed, wherein the transverse acceleration is below a predetermined value. When negotiating tight corners during manoeuvring the vehicle at low speed the driver needs to turn the steering wheel less and/or with less effort than under normal conditions to achieve a desired wheel angle. This provides an oversteered response, giving the driver the impression that the vehicle is easily in all manoeuvred.

As stated above, the decision to apply the method according to the second example is dependent on the current state of the steering arrangement. The current state of the steering arrangement is in turn dependent on the current loading on said arrangement, which is proportional to the lateral acceleration of the vehicle. The lateral acceleration is determined by the electronic control unit using available sensors on the vehicle, such as an acceleration sensor or a vehicle speed sensor in combination with known vehicle chassis data (vehicle wheel base, etc.).

In addition, the first and the second actuators can be arranged to apply torque to the output shaft and the input shaft in the same direction in response to the determined current state of the steering arrangement, in order to provide steering assistance.

The invention further relates to a vehicle comprising a steering arrangement as described above.

The present invention also relates to a computer program, computer program product and a storage medium for a computer all to be used with a computer for executing the method as described in any one of the above examples.

The invention relates to a computer program comprising program code means for performing all the steps of the method described above when said program is run on a computer.

The invention also relates to a computer program product comprising program code means stored on a computer readable medium for performing all steps of the method described above when said program product is run on a computer.

The invention further relates to a storage medium such as a computer memory or a nonvolatile data storage medium for use in a computing environment, the memory comprising a computer readable program code to perform the method described above.

BRIEF DESCRIPTION OF THE DRAWINGS

In the following text, the invention will be described in detail with reference to the attached drawings. These schematic drawings are used for illustration only and do not in any way limit the scope of the invention. In the drawings.

DETAILED DESCRIPTION

Figure 1:
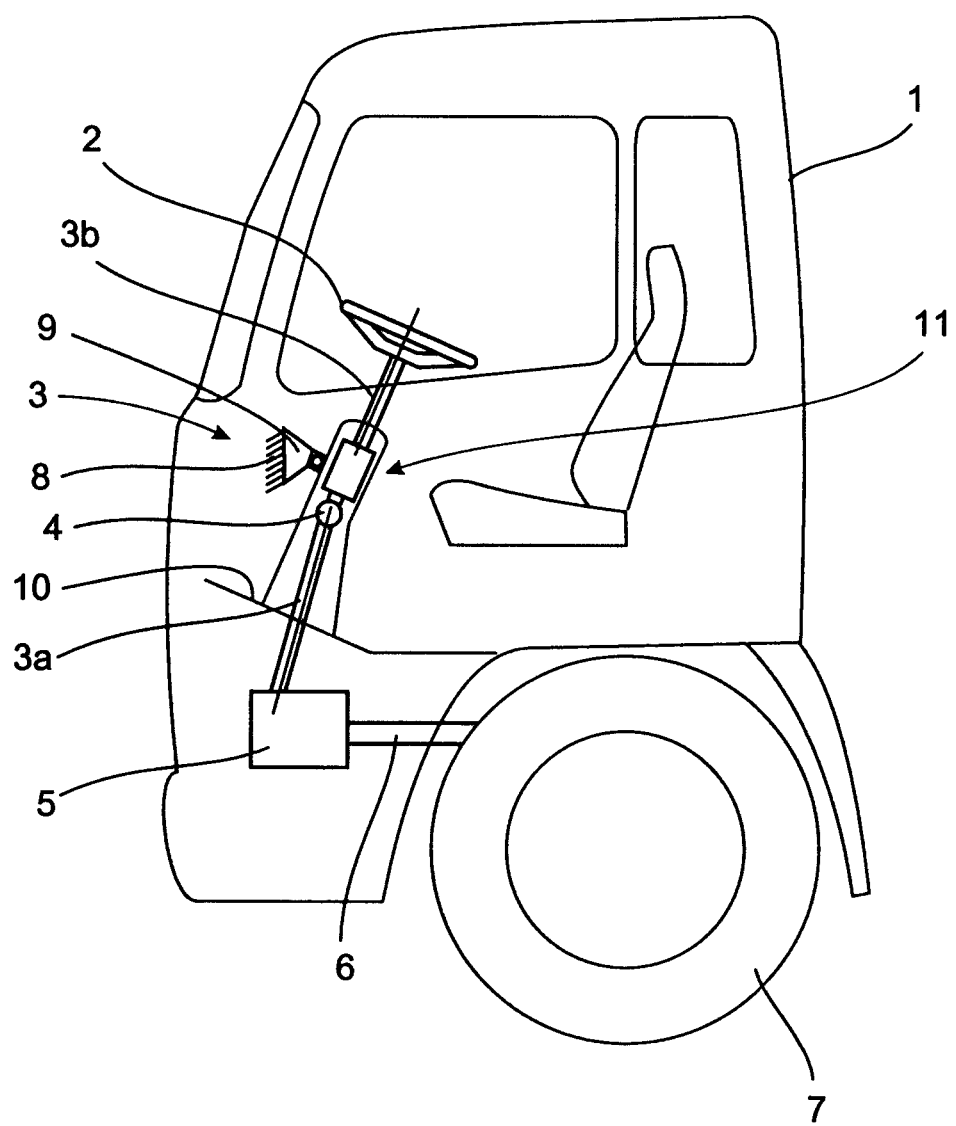
FIG. 1 shows a schematically indicated vehicle with a steering arrangement according to the invention.

FIG. 1 shows a schematically indicated vehicle with a cab 1 in which a steering wheel 2 for steering the vehicle is mounted. The steering wheel 2 is connected to a steering main shaft 3 which comprises an upper portion or input shaft 3b, and a lower portion, or output shaft 3a. The steering main shaft 3 is schematically indicated and may optionally comprise additional components, such as one or more universal joints 4 if required. The steering main shaft 3 is connected to a steering gear 5 which, via a steering linkage 6, can act on a pair of wheels 7 in order to steer the vehicle. The steering main shaft can extend in a support 8, the upper part of which is provided with an attachment 9 mounted on the cab or dashboard of the vehicle, and the lower part of which is fixed to the floor 10 of the cab. An arrangement 11 for assisting the driver when steering the vehicle is located between the input shaft 3b and the output shaft 3a, which arrangement will be described in further detail below. The example shown in FIG. 1 is only one possible steering arrangement and is used for illustration purposes only. The invention is not limited for use in this particular example.

Figure 2:
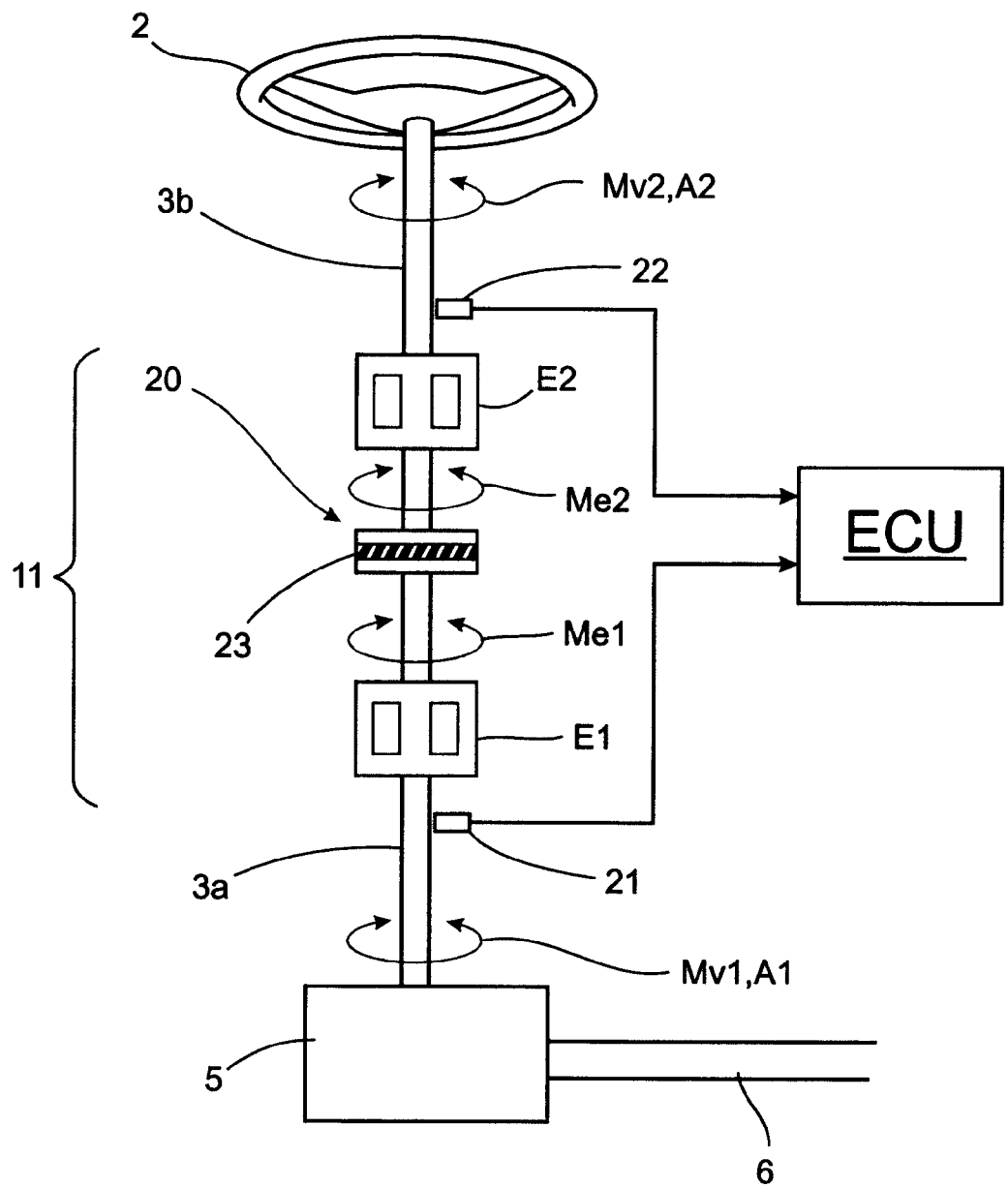
FIG. 2 shows a schematic diagram of a steering arrangement according to the invention.

FIG. 2 shows a schematic diagram of a steering arrangement according to the invention. With reference to FIG. 1, the steering arrangement comprises an input shaft 3b connected to a steering wheel 2 and an output shaft 3a connected to at least one pair of wheels via a steering linkage. The steering arrangement has a mechanical interconnection 20 between the output shaft 3a and the input shaft 3b, and angular sensors 21, 22 arranged to detect the angular positions of the ground engaging members and the steering wheel, indicated by the output shaft 3a and the input shaft 3b respectively. An electronic control unit ECU is arranged to determine a current state of the steering arrangement based on the input from the angular sensors 21, 22. The current state of the steering arrangement is dependent on the angles detected by these sensors, as well as on the current loading on the steering arrangement. The current loading is proportional to the lateral acceleration of the vehicle. The electronic control unit ECU is arranged to determine the lateral acceleration by conventional means, for instance, by available sensors on the vehicle, such as an acceleration sensor or a vehicle speed sensor (sensors not shown) in combination with vehicle chassis data (vehicle wheel base, etc.).

The steering arrangement further comprises a first actuator E1 connected to the output shaft 3a, and a second actuator E2 connected to the input shaft 3b. The first and second actuators can be electric or hydraulic motors. An elastic steering force transmitting element 23 connects the output shaft 3a and the input shaft 3b. This connecting portion between the output shaft 3a and the input shaft 3b can be made from a suitable resilient material, such as natural or synthetic rubber, or a similar suitable material. Depending on the application the steering force transmitting element 23 can have a maximum angle of twist in the range 5-20°. The maximum angle of twist is the angle above which the angular difference will no longer increase, even if the torque applied over the resilient portion is increased.

The first and the second actuators E1, E2 are individually controllable and are arranged to rotate the output shaft 3a and the input shaft 3b, respectively, either in the same or in opposite directions in response to the detected angular positions of the steering wheel 2 and the angle of the ground engaging members, as represented by the output shaft 3a, and the current state of the steering arrangement. The steering force transmitting element 23 is arranged to allow an angular difference between the output shaft 3a and the input shaft 3b. At the same time the steering force transmitting element 23 is arranged to apply a torque to the steering device 2 proportional to the angular difference between the output shaft 3a and the input shaft 3b. The magnitude of the applied torque is dependent on the angular difference and the stillness of the elastic steering force transmitting element 23.

In general, the first and the second actuators E1, E2 can be controlled to act in the same direction in order to provide servo assistance for turning the ground engaging members, either instead of or in conjunction with an existing servo mechanism or steering gear. Alternatively, the first and the second actuators E1, E2 can be controlled to act in opposite directions in order to provide an enhanced steering feel and to assist the driver under predetermined conditions, for instance when unexpected or undesirable feedback is transmitted towards the steering wheel from the ground engaging members or the steering linkage.

In FIG. 2, the torque v2 is the torque applied by the driver and the torque Mv1 is the torque required to achieve a desired angle for the ground engaging members as requested by the driver through the steering wheel 2. Similarly, the torque Me1 is the torque applied to the output shaft 3a by the first actuator E1, and the torque Me2 is the torque applied to the input shaft 3b by the second actuator E2.

In operation, the steering arrangement is controlled using a general method involving the steps of:
  detecting a first steering angle A1 for the output shaft 3a, which first steering a indicates the position of the ground engaging members;
  detecting a second steering angle A2 for the input shaft, which second steering angle indicates the position of the steering wheel 2;
  comparing the first and second steering angles A1, A2 and determining a current state of the steering arrangement; and
  controlling a first actuator E1 connected to the output shaft 3a and a second actuator P2 connected to the input shaft 3b in response to the detected first and second steering angles A1, A2, in order to achieve a desired state of the steering arrangement;

An angular difference between the output shaft 3a and the input shaft 3b causes the elastic steering force transmitting element 23 apply a torque to the steering device 2 proportional to the angular difference between the output shaft 3a and the input shaft 3b.

The subsequent text describes a number of specific examples where a current state of steer in arrangement requires rotation of the input shaft and/or the output shaft in opposite directions. According to these examples, the method involves the step of controlling the first and the second actuators by applying torque to the input shaft and the output shaft in opposite directions in response to the determined current state of the steering arrangement.

In a first example the method can be used for steering error compensation, in order to prevent undesirable feedback is transmitted towards the steering wheel from the ground engaging members or the steering linkage. In this case the method involves the steps of:
  detecting a changing first steering angle indicating a deflection of the ground engaging members;
  detecting a constant second steering angle indicating a fixed position of the steering device;
  controlling the first and the second actuators in response to the detected first steering angle;
  counteracting the torque transmitted from the ground engaging members by applying an equal and opposite torque to the output shaft; and
  counteracting the torque transmitted from the output shaft by applying an equal and opposite torque to the input shaft to maintain a constant second steering angle for the steering device.

Figure 3A:
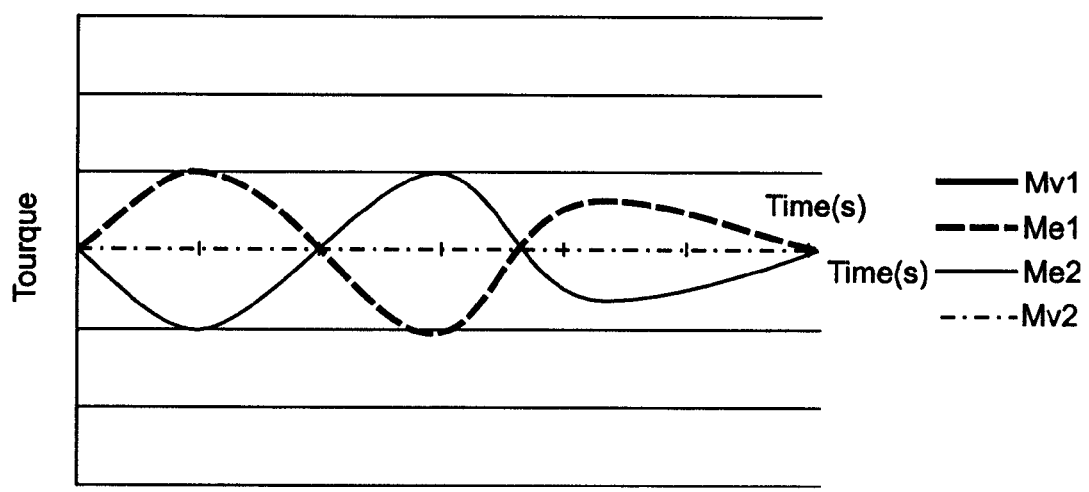
FIGS. 3A-B show schematic diagrams plotting torque and steering shaft angles over time during a procedure for dynamic steering error compensation.
Figure 3B:
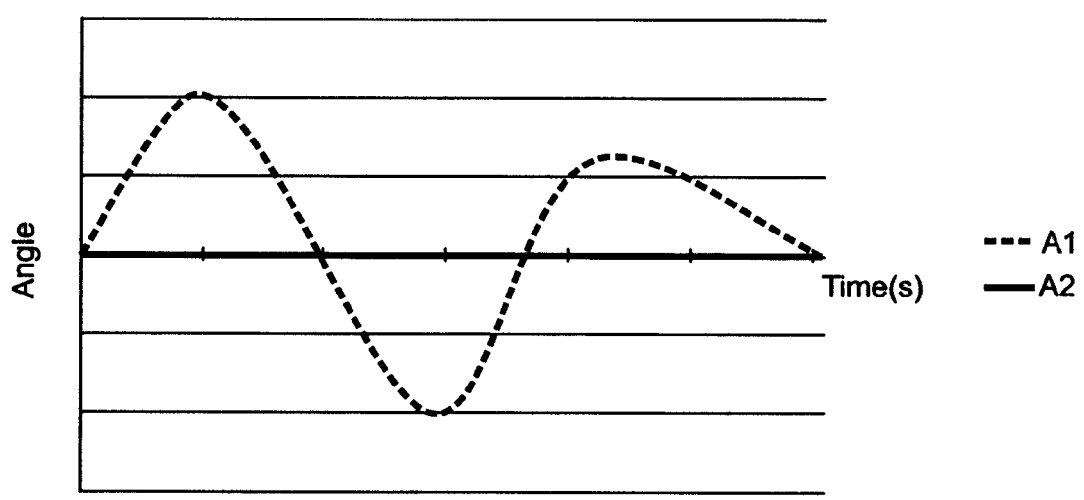

FIGS. 3A-3B show schematic diagrams plotting torque and steering shaft angles over time during a procedure for dynamic steering error compensation. FIG. 3A shows a case where the vehicle is travelling straight ahead when at least one steerable wheel encounters an obstacle, causing the wheel(-s) to deflect upwards, causing a bump or roll steer condition. A bump steer condition is a transient state which occurs when at least one steerable wheel encounters an obstacle causing both wheels rise together. A roll steer condition is a transient state which occurs when at least one steerable wheel rises.

As the vehicle is travelling straight ahead, the torque input Mv2 from the driver and the torque output Mv1 to the wheels is zero. As indicated in FIG. 3B, the second steering angle A2 for the input shaft is zero, as the driver is not turning the steering wheel. However, the deflection of the wheel causes a displacement of the steering linkage, inducing a fluctuating rotation of the output shaft and a corresponding change in the first steering angle A1. By controlling the first and the second actuators E1, E2 to apply a fluctuating torque Me1, Me2 in equal and opposite directions, it is possible to counteract a fluctuating torque transmitted from the wheels to the steering shaft. In this way it is possible to prevent or at least reduce dynamic steering errors from being transmitted to the steering wheel. The relative angular difference between the input and output shafts will be taken up by the elastic steering force transmitting element (FIG. 2) to eliminate the fluctuating torque input Mv2 from reaching the steering wheel.

Figure 4A:
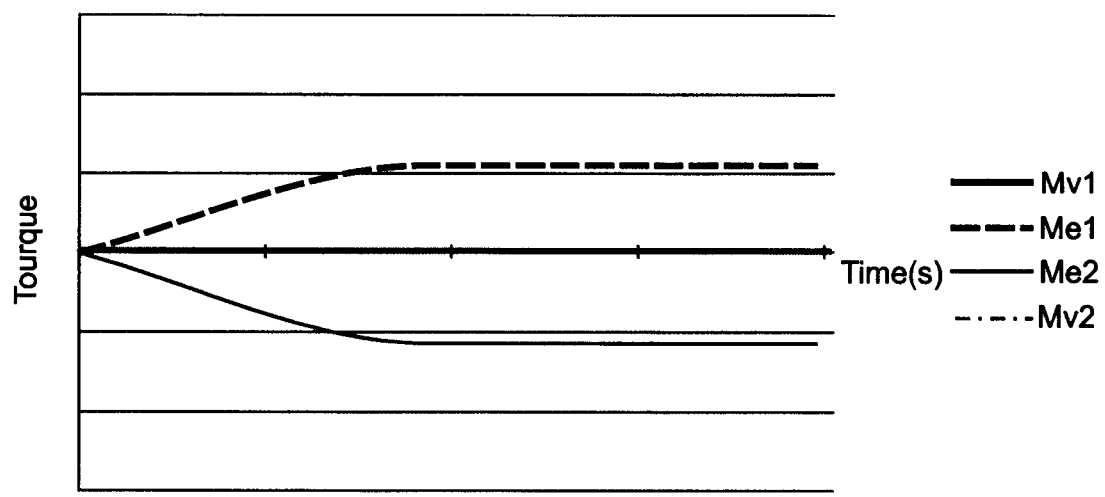
FIGS. 4A-B show schematic diagrams plotting torque and steering shaft angles over time during a procedure for static steering error compensation.
Figure 4B:
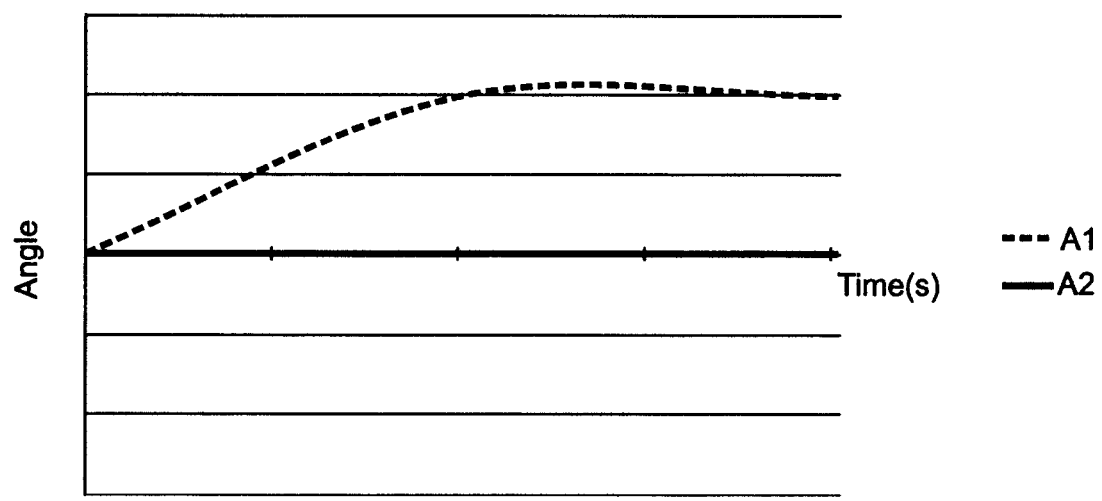

FIGS. 4A-4B show schematic diagrams plotting torque and steering shaft angles over time during a procedure for static steering error compensation. FIG. 4A shows a case where the vehicle is travelling straight ahead while being loaded so that the front of the chassis is elevated above a predetermined level. The relative positions of the steerable wheels and the steering gear will generate a static steering error that cannot be corrected by the steering geometry of the steering linkage. A static steering error of one or more degrees causes the steering wheel to be offset, or angled off centre. Even if the static steering error is relatively small it is noticeable to the driver when the vehicle is travelling straight ahead.

As the vehicle is travelling straight ahead, the torque input Mv2 from the driver and the torque output Mv1 to the wheels is zero. As indicated in FIG. 4B, the second steering angle A2 for the input shaft is zero, as the driver is not turning the steering wheel. However, the static steering error causes a displacement of the steering linkage, inducing a rotation of the output shaft and a corresponding change in the first steering angle A1. By controlling the first and the second actuators E1, E2 to apply a static torque Me1, Me2 in equal and opposite directions, it is possible to counteract the static torque transmitted from the steering linkage to the steering shaft. In this way it is possible to prevent static steering errors from being transmitted to the steering wheel. The relative angular difference between the input and output shafts will be taken up by the elastic steering force transmitting element (FIG. 2) to prevent the static torque input Mv2 from offsetting the steering wheel.

In a second example the method can be used for providing a desired steering feel to the driver, which steering feel can be adapted to the current driving situation. In this case the method involves the steps of:
  detecting a current first steering angle indicating a deflection of the ground engaging members;
  detecting a current second steering angle indicating a steering input from the steering device;
  controlling the first and the second actuators in response to the detected first steering angle;
  applying a first torque to the output shaft to transmit a steering torque to the ground engaging members (4) in response to the steering input; and
  applying a second torque to the input shaft in the opposite direction providing a resistance to the steering input.

Figure 5A:
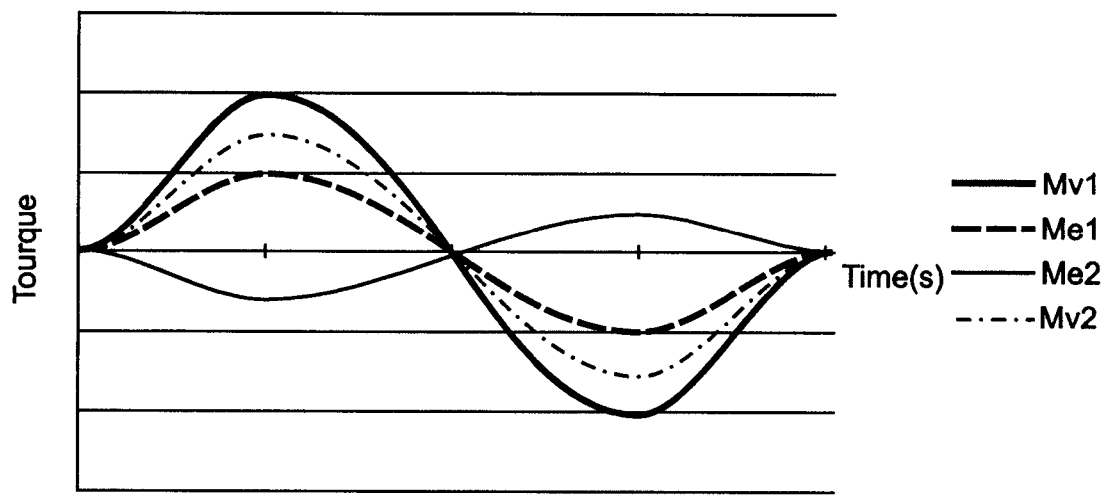
FIGS. 5A-B show schematic diagrams plotting torque and steering shaft angles over time during a procedure for understeer response.
Figure 5B:
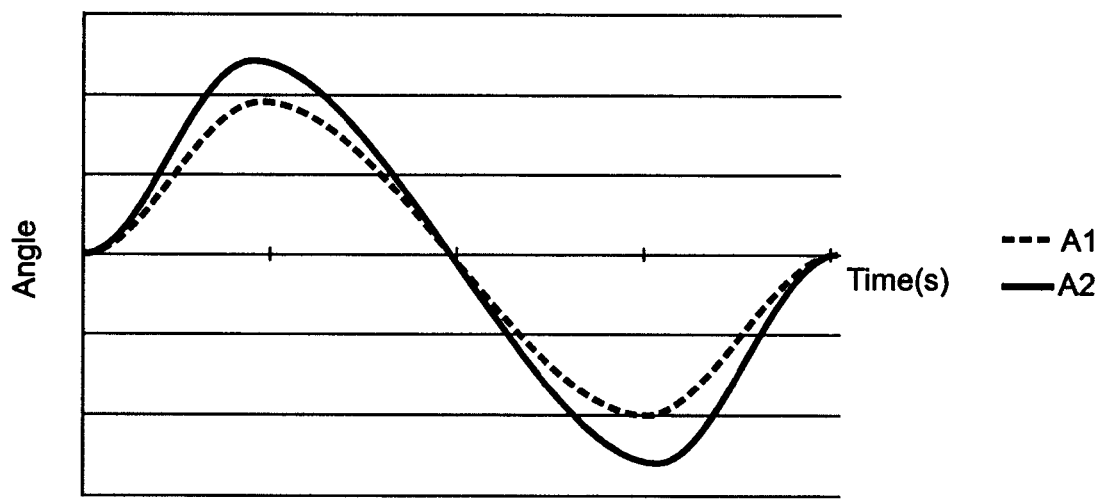

FIGS. 5A-5B show schematic diagrams plotting torque and steering shaft angles over time during a procedure for creating an understeer response.

FIG. 5A shows a case where the vehicle is travelling along a road at a predetermined cruising speed. A torque is then applied to the steering wheel in a first direction, then in the opposite direction, before being returned to the original position. Examples of conditions where such a manoeuvre may be performed are sudden evasive action or counteraction of suspension steering when negotiating a bend, during which condition the transverse acceleration is above a predetermined value.

In particular, when negotiating a bend the vehicle will tend to roll around its longitudinal centre of gravity, so that it will lean outwards through the bend. This will increase the load on the suspension for the outer wheels and decrease the load on the suspension for the inner wheels. This condition can induce a degree of roll steer to the steering linkage that can vary depending on the speed of the vehicle and the curvature and banking of the road. When roll steer is transmitted to the steering wheel, the driver will try to compensate to maintain a desired trajectory through the curve.

However, as the roll steer can vary with the load on the suspension, the vehicle can go from being understeered to being oversteered depending on the current load on the suspension and the weight of the vehicle. If the driver attempts to compensate for roll steer at a time when the vehicle becomes oversteered, he will in fact over-compensate. When realizing this, he will immediately attempt to cancel the over-compensation by returning the steering wheel to its original position. If the vehicle is still oversteered, this action can cause an overcompensation in the opposite direction. The aim of the invention is to eliminate or at least reduce the risk of this situation from occurring.

From FIG. 5A it can be seen that the driver applies a torque input Mv2 to compensate for roll steer. In order to provide a feeling of understeer and prevent over-compensation, the output angle A1 of the output shaft should be less than the input angle A2 from the steering wheel, as indicated in FIG. 5B. This is achieved by applying a first torque Me1 to the output shaft that is less than a second torque Me2 applied to the input shaft, as long as the second torque Me2 is not zero. The resulting torque Mv1 to the output shaft will counteract the input torque Mv2 applied by the driver to provide a steering feel indicating understeer. The steering force transmitting element 23 (FIG. 2) is arranged to apply a torque to the steering device 2 proportional to the angular difference between the output shaft 3a and the input shaft 3b; in this case resisting the input torque Mv2 applied by the driver to achieve the desired condition.

As stated above, this function is desirable when a vehicle with a heavy load is negotiating a bend in the road. In order to achieve the required wheel angle to follow the bend, the driver has to turn the steering wheel further than under normal conditions. This will give the driver the impression that the vehicle is understeered, which encourages the driver to reduce speed through bends.

Figure 6A:
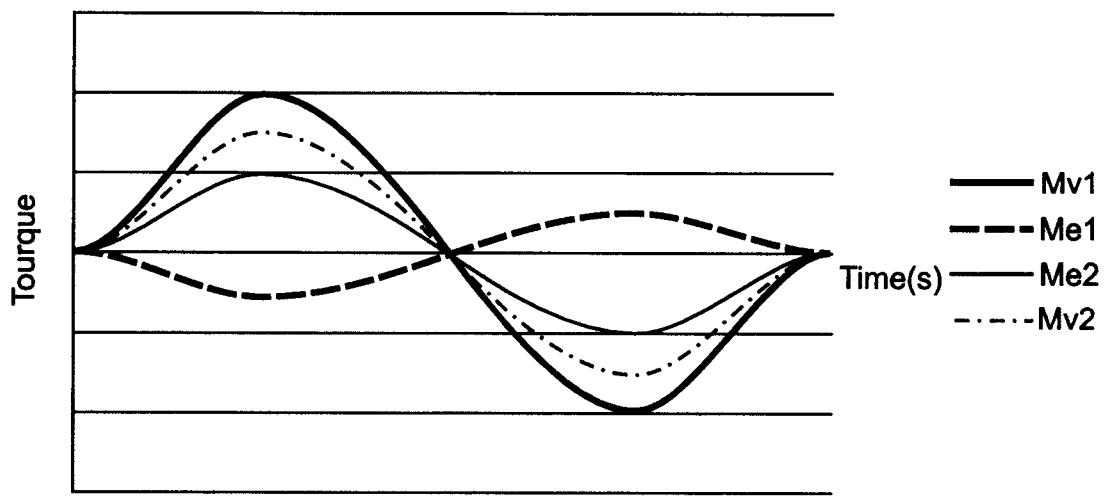
FIGS. 6A-B show schematic diagrams plotting torque and steering shaft angles over time during a procedure for oversteer response.
Figure 6B:
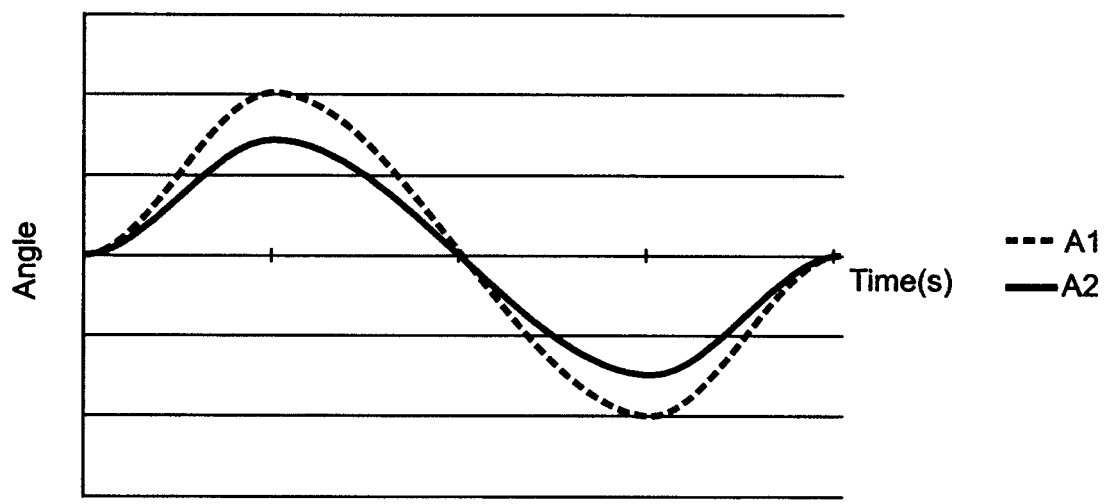

FIGS. 6A-6B show schematic diagrams plotting torque and steering shaft angles over time during a procedure for oversteer response.

FIG. 6A shows a case where the vehicle is being manoeuvred at relatively low speed. When negotiating tight corners during manoeuvring of the vehicle at low speed it is desirable that the driver needs to turn the steering wheel less than under normal conditions to achieve a desired wheel angle. Typically, under these conditions the transverse acceleration is below a predetermined value.

From FIG. 6A it can be seen that the driver applies a torque input Mv2 to the steering wheel. In order to provide a feeling of oversteer and facilitate manoeuvrability, the output angle A1 of the output shaft should be greater than the input angle A2 from the steering wheel, as indicated in FIG. 6B. This is achieved by applying a first torque Me1 to the output shaft that is greater than a second torque Me2 applied to the input shaft, as long as the second torque Me2 is not zero. The resulting torque Mv1 to the output shaft will assist the input torque Mv2 applied by the driver to provide a steering feel indicating oversteer. The steering force transmitting element 23 (FIG. 2) is arranged to apply a torque to the steering device 2 proportional to the angular difference between the output shaft 3a and the input shaft 3b; in this case assisting the input torque Mv2 applied by the driver to achieve the desired condition.

As stated above, this function provides an oversteered response, giving the driver the impression that the vehicle is easily manoeuvred.

The present invention also relates to a computer program, computer program product and a storage medium for a computer all to be used with a computer for executing the method as described in any one of the above examples.

Figure 7:
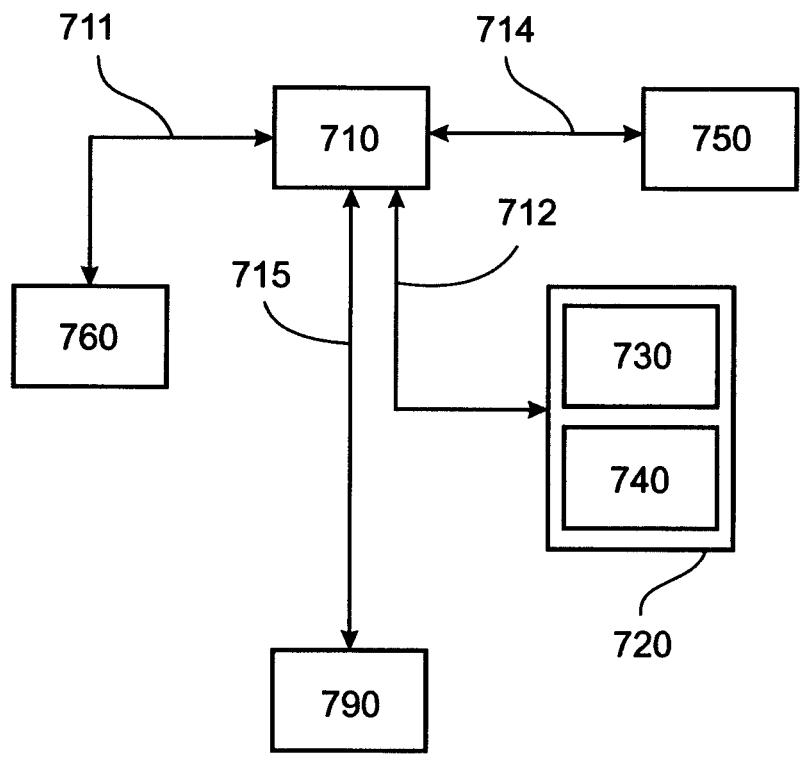
FIG. 7 shows the invention applied on a computer arrangement.

FIG. 7 shows an apparatus according to one embodiment of the invention, comprising a non-volatile memory 720, a processor 710 and a read and write memory 760. The memory 720 has a first memory part 730, in which a computer program for controlling the apparatus is stored. The computer program in the memory part 730 for controlling the apparatus can be an operating system. The apparatus can be enclosed in, for example, a control unit, such as an electronic control unit ECU (see FIG. 2). The data-processing unit 710 can comprise, for example, a microcomputer.

The memory 720 also has a second memory part 740, in which a program for controlling the target gear selection function according to the invention is stored. In an alternative embodiment, the program for controlling the transmission is stored in a separate non-volatile storage medium 750 for data, such as, for example, a CD or an exchangeable semiconductor memory. The program can be stored in an executable form or in a compressed state.

When it is stated below that the data-processing unit 710 runs a specific function, it should be clear that the data-processing unit 710 is running a specific part of the program stored in the memory 740 or a specific part of the program stored in the non-volatile storage medium 750.

The data-processing unit 710 is tailored for communication with the storage memory 750 through a data bus 714. The data-processing unit 710 is also tailored for communication with the memory 720 through a data bus 712. In addition, the data-processing unit 710 is tailored for communication with the memory 760 through a data bus 711. The data-processing unit 710 is also tailored for communication with a data port 790 by the use of a data bus 715. The method according to the present invention can be executed by the data-processing unit 710, by the data-processing unit 710 running the program stored in the memory 740 or the program stored in the non-volatile storage medium 750.

The invention should not be deemed to be limited to the embodiments described above, but rather a number of further variants and modifications are conceivable within the scope of the following patent claims.

The invention claimed is:

1. A method for assisting a driver of a vehicle during operation by providing the driver with a desired steering feel, wherein the vehicle comprises a steering arrangement comprising an input shaft connected to a manually operated steering device, an output shaft connected to at least one pair of ground engaging members and a mechanical interconnection connecting the output shaft and the input shaft, comprising
   detecting a first steering angle for the output shaft, which first steering angle indicates the position of the ground engaging members;
   detecting a second steering angle for the input shaft, which second steering angle indicates the position of the steering device;
   comparing the first and second steering angles and determining a current state of the steering arrangement; and
   controlling a first actuator connected to the output shaft and a second actuator connected to the input shaft in response to the detected first and second steering angles, in order to achieve a desired state of the steering arrangement;
   applying a torque to the steering device proportional to the angular difference between the output shaft and the input shaft using a resilient portion in the mechanical interconnection, in order to provide the driver with a desired steering feel.

2. Method according to claim 1, comprising controlling the first and the second actuators by applying torque to the input shaft and the output shaft in opposite directions in response to the determined current state of the steering arrangement.

3. Method according to claim 1, comprising
detecting a changing first steering angle indicating a deflection of the ground engaging members;
detecting a constant second steering angle indicating a fixed position of the steering device:
controlling the first and the second actuators in response to the detected first steering angle;
counteracting the torque transmitted from the ground engaging members by applying an equal and opposite torque to the output shaft; and
counteracting the torque transmitted from the output shaft by applying an equal and opposite torque to the input shaft to maintain a constant second steering angle for the steering device.

4. Method according to claim 3, comprising controlling the first and the second actuators to apply a fluctuating torque in equal and opposite directions to counteract a fluctuating torque from the ground engaging member during a bump steer condition.

5. Method according to claim 3, comprising controlling the first and the second actuators to apply a continuous torque in equal and opposite directions to counteract a suspension induced torque from a steering linkage connecting the ground engaging members and the output shaft.

6. Method according to claim 5, comprising applying the continuous torque to maintain the steering device in a predetermined position, in order to provide steering error compensation.

7. Method according to claim 1, comprising
detecting a current first steering angle indicating a deflection of the ground engaging members;
detecting a current second steering angle indicating a steering input from the steering device;
controlling the first and the second actuators in response to the detected first steering angle;
applying a first torque to the output shaft to transmit a steering torque to the ground engaging members in response to the steering input; and
applying a second torque to the input shaft in the opposite direction providing a resistance to the steering input.

8. Method according to claim 7, comprising applying a first torque that is less than the second torque to provide a steering feel indicating understeer.

9. Method according to claim 7, comprising, applying a first torque that is greater than the second torque to provide a steering feel indicating oversteer.

10. Steering arrangement in a vehicle, which power steering arrangement comprises an input shaft connected to a manually operated steering device, an output shaft connected to at least one pair of ground engaging members and a mechanical interconnection between the input shaft and the output shaft, and angular sensors arranged to detect the angular positions of the steering device and the ground engaging members and an electronic control unit arranged to determine a current state of the steering arrangement, wherein the power steering arrangement farther comprises a first actuator connected to the output shaft, a second actuator connected to the input shaft, and an elastic steering force transmitting element connecting the input shaft and the output shaft,
wherein the first and the second actuators are individually controllable and are arranged to rotate the output shaft and the input shaft, respectively, in opposite directions in response to the detected angular positions of the steering device and the ground engaging members, and the current state of the steering arrangement, and
wherein the steering force transmitting element is arranged to apply a torque to the steering device proportional to the angular difference between the output shaft and the input shaft.

11. Steering arrangement according to claim 10, wherein the first and the second actuators are arranged to apply torque to the output shaft and the input shaft in opposite directions in response to the determined current state of the steering arrangement.

12. Steering arrangement according to claim 10, wherein the first and the second actuators are arranged to apply a fluctuating torque in equal and opposite directions to counteract a fluctuating torque from the ground engaging members (4) during a bump steer condition.

13. Steering arrangement according to claim 10, wherein the first and the second actuators are arranged to apply a continuous torque in equal and opposite directions to counteract a suspension induced torque from a steering linkage connecting the ground engaging members and the output shaft, in order to maintain the steering device in a predetermined position.

14. Steering arrangement according to claim 10, wherein the first actuator is arranged to apply a first torque to the output shaft to transmit a steering torque to the ground engaging members in response to the steering input; and that the second actuator is arranged to apply a second torque to the input shaft in the opposite direction providing a resistance to the steering input.

15. Steering arrangement according to claim 14, wherein the first torque is less than the second torque to provide a steering feel indicating understeer.

16. Steering arrangement according to claim 14, wherein the first torque that is greater than the second torque to provide a steering feel indicating oversteer.

17. Steering arrangement according to claim 10, wherein the first and the second actuators are arranged to apply torque to the output shaft and the input shaft in the same direction in response to the determined current state of the steering arrangement, in order to provide steering assistance.

18. Vehicle, comprising a power steering arrangement, the power steering arrangement comprising an input shaft connected to a manually operated steering device, an output shaft connected to at least one pair of ground engaging members and a mechanical interconnection between the input shaft and the output shaft, and angular sensors arranged to detect the angular positions of the steering device and the around engaging members and an electronic control unit arranged to determine a current state of the steering arrangement, wherein the power steering arrangement further comprises a first actuator connected to the output shaft, a second actuator connected to the input shaft, and an elastic steering force transmitting element connecting the input shaft and the output shaft,
wherein the first and the second actuators are individually controllable and are arranged to rotate the output shaft and the input shaft, respectively, in opposite directions in response to the detected angular positions of the steering device and the ground engaging members, and the current state of the steering arrangement, and
wherein the steering force transmitting element is arranged to apply a torque to the steering device proportional to the angular difference between the output shaft and the input shaft.

19. A computer comprising a program stored on a non-transitory computer readable medium for performing all the steps of a method for assisting a driver of a vehicle during operation by providing the driver with a desired steering feel, wherein the vehicle comprises a steering arrangement comprising an input shaft connected to a manually operated steering device, an output shaft connected to at least one pair of ground engaging members and a mechanical interconnection connecting the output shaft and the input shaft, comprising detecting a first steering angle for the output shaft, which first steering angle indicates the position of the ground engaging members;

detecting a second steering angle for the input shaft, which second steering angle indicates the position of the steering device;

comparing the first and second steering angles and determining a current state of the steering arrangement; and controlling a first actuator connected to the output shaft and a second actuator connected to the input shaft in response to the detected first and second steering angles, in order to achieve a desired state of the steering arrangement;

applying a torque to the steering, device proportional to the angular difference between the output shaft and the input shaft using a resilient portion in the mechanical interconnection, in order to provide the driver with a desired steering feel.

20. A computer program product comprising a program stored on a non-transitory computer readable medium for performing all steps of a method for assisting a driver of a vehicle during operation by providing the driver with as desired steering feel, wherein the vehicle comprises a steering arrangement comprising an input shaft connected to a manually operated steering device, an output shaft connected to at least one pair of ground engaging members and a mechanical interconnection connecting the output shaft and the input shaft, comprising detecting a first steering angle for the output shaft, which first steering angle indicates the position of the ground engaging members;

detecting a second steering angle for the input shaft, which second steering angle indicates the position of the steering device;

comparing the first and second steering angles and determining a current state of the steering arrangement; and controlling a first actuator connected to the output shaft and a second actuator connected to the input shaft in response to the detected first and second steering angles, in order to achieve a desired state of the steering arrangement;

applying a torque to the steering device proportional to the angular difference between the output shaft and the input shaft using, a resilient portion in the mechanical interconnection, in order to provide the driver with a desired steering feel when the program product is run on a computer.

21. A non-transitory storage medium for use in a computer, comprising a computer readable program to perform a method for assisting a driver of a vehicle during operation by providing the driver with a desired steering feel, wherein the vehicle comprises a steering arrangement comprising an input shaft connected to a manually operated steering device, an output shaft connected to at least one pair of ground engaging members and a mechanical interconnection connecting the output shaft and the input shaft, comprising detecting a first steering angle for the output shaft, which first steering angle indicates the position of the ground engaging members;

detecting a second steering angle for the input shaft, which second steering angle indicates the position of the steering device;

comparing the first and second steering angles and determining a current state of the steering arrangement; and controlling a first actuator connected to the output shaft and a second actuator connected to the input shaft in response to the detected first and second steering angles, in order to achieve a desired state of the steering arrangement;

applying a torque to the steering device proportional to the angular difference between the output shaft and the input shaft using a resilient portion in the mechanical interconnection, in order to provide the driver with a desired steering feel.

\* \* \* \* \*